Aug. 24, 1943.　　C. D. RYDER　　2,327,605
FASTENING DEVICE
Filed July 30, 1941
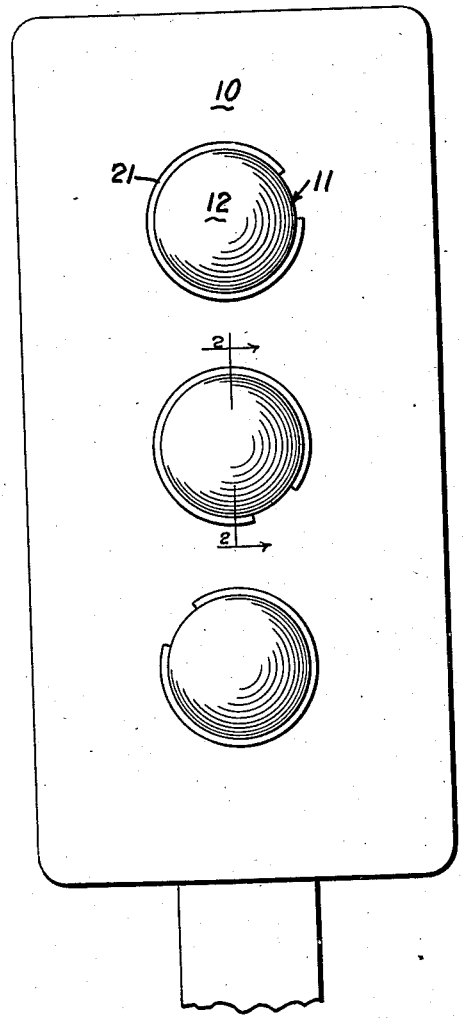
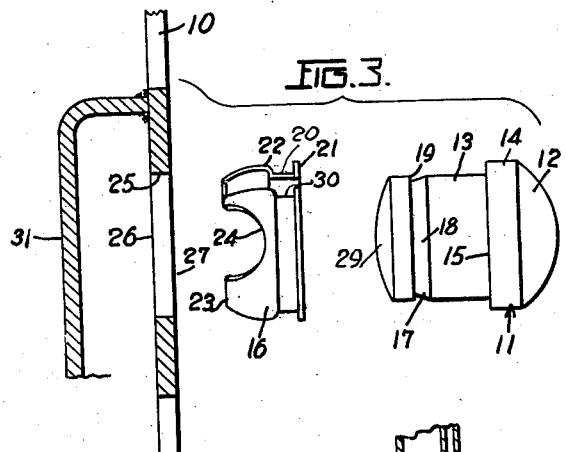
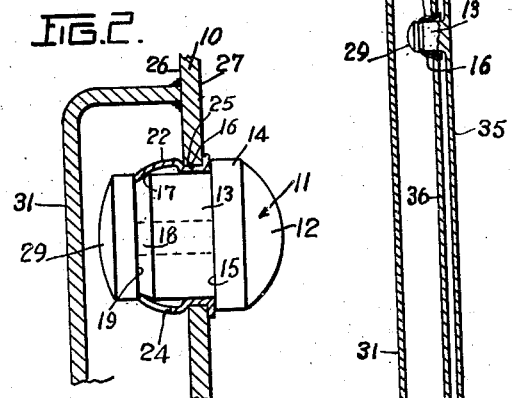
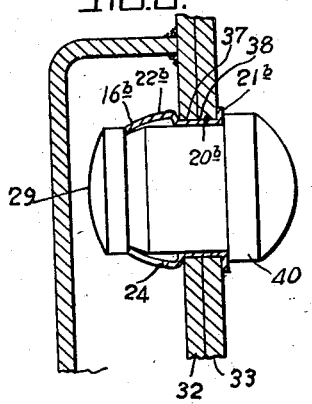
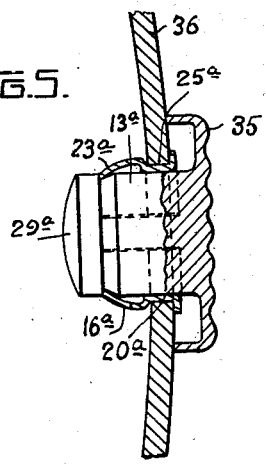
CHARLES D. RYDER, Inventor Patented Aug. 24, 1943

2,327,605

UNITED STATES PATENT OFFICE 2,327,605

FASTENING DEVICE

Charles D. Ryder, Bellevue, Ky., assignor to The National Colortype Company, Bellevue, Ky., a corporation of Kentucky Application July 30, 1941, Serial No. 404,682

3 Claims. (Cl. 85—5)

This invention relates to a fastening device for securing a plurality of parts into a relatively permanent assembly.

An object of the invention is to provide a fastening device which is adapted to prepare a hole in a metal sheet for receiving a member to be secured to the metal sheet, the member received into the fastening device cooperating therewith to lock the inserted member within the fastening device.

Another object of the invention is to provide a substantially cylindrical spring clip for insertion in a hole in a metal sheet which is adapted to cooperate with a member to be positioned within the hole of the metal sheet for locking the same therein.

Another object of the invention is to provide a relatively inexpensive clip adapted to cooperate with a member to be inserted in a hole in a metal sheet for securing the member within the hole.

Another object of the invention is to provide a fastening device adapted to secure a plurality of metal sheets together by insertion of the device within cooperating holes in adjacent metal sheets.

Another object of the invention is to provide a fastening device for securing a reflector button in a metal sheet.

Another object of the invention is to provide a fastening device for securing a reflector button within a metal sheet which is constructed and arranged to permit easy assembly of the button within holes in a metal sheet but which prevents removal of the button after the device has once been assembled in a hole in the metal sheet.

Another object of the invention is to provide a substantially tamperproof fastening device for securing two or more parts in substantially permanent relationship.

Another object of the invention is to provide a fastening device for two or more members which is constructed and arranged to permit easy assembly of the members but which prevents disassembly of the members as long as one end of the fastening device is concealed.

Another object of the invention is to provide a tamperproof fastening device for reflector buttons for road signs and the like which prevents removal of the buttons from the signs after it has once been assembled upon the same.

Further objects and advantages will become apparent from the following description and the drawing.

In the drawing:

Figure 1 is an elevational view of a road sign having reflector buttons held in position by means of the device of this invention.

Figure 2 is a cross-sectional view taken along line 2—2 of Figure 1, showing a reflector button assembled in the road sign.

Figure 3 is an elevational view of the parts of the fastening device showing the relationship between the parts and a metal sheet within which they are to be positioned and showing the manner of assembly of the respective elements.

Figure 4 is a cross-sectional view showing the use of the fastening device for securing a molding or like structure to a metal sheet.

Figure 5 is a cross-sectional view taken along line 5—5 of Figure 4.

Figure 6 is a cross-sectional view showing the manner in which two or more metal sheets can be fastened in adjacent relationship by means of the fastening device of this invention.

In this invention the fastening device consists of a spring clip which is adapted to be positioned within a hole supplied in an element or metal sheet which is provided for carrying one or more members adapted to be assembled thereon. The member which is to be assembled upon the metal sheet is provided with one or more protrusions which are positioned within the spring clip to prevent the spring clip from being removed from the metal sheet. When the protrusion is forced completely within the spring clip the protrusion and the clip cooperate to lock the member from which the protrusion projects to the metal sheet.

More particularly, the invention relates to the fastening of reflector buttons upon road sign panels or like structures in a manner to prevent removal of the reflector buttons due to unnecessary tampering with the button. While the invention is primarily for the purpose of fastening reflector buttons upon metal panels, yet the use of the fastening device is not confined to such a particular use. The cooperation of the spring clip and the protrusion adapted to extend within the spring clip is such that the fastening device finds use in connection with the securing of decorative molding upon panels or walls as well as securing metal sheets in adjacent relationship.

In Figures 1, 2 and 3 the device is shown in a manner in which it will be used to secure a reflector button upon roadside panels or like structures. In this form of the invention the roadside panel 10 is provided with a plurality of reflector buttons 11. The reflector buttons 11 have a suitable face 12 adapted to reflect light from oncoming vehicles in the usual manner.

The reflector button 11 consists of a cylindrical shank 13 having an enlarged head 14 upon one end thereof. The reflector button face 12 may be formed as an integral portion of the enlarged head 14 or can be formed as an insert adapted to be carried by the head 14. A shoulder 15 is formed between the shank 13 and the enlarged head 14 to provide a stop against which spring clip 16 will be positioned when the reflector button is assembled therein.

The shank 13 of the reflector button 11 is provided with an annular groove 17 and has an angular face 18, the angle of the face being toward the axis of the reflector button whereby a shoulder 19 is provided between the face 18 and the outer diameter of the shank 13. The reflector button 11 just described is adapted to be positioned within the spring clip 16.

The spring clip 16 consists of a substantially cylindrical sheet metal body having a slot 30 provided longitudinally in the body. The body of the spring clip 16 is formed in a manner to provide an annular groove 20. The groove 20 is defined on one side by means of an annular flange 21 and upon the opposite side by means of an arcuate flange 22. The flange 22 is provided with a plurality of extending arms 23 which are bent inwardly toward the axis of the cylindrical body of the spring clip 16.

The arms 23 are separated from each other by means of an undercut portion 24 whereby the arms 23 form individual springs for holding the reflector button 11 within the spring clip 16 in a manner which will be hereinafter described. When making roadsigns or like structures it is conventional to provide metal panels upon which a plurality of reflector buttons are mounted to outline numerals, letters or other figures.

To assemble the reflector buttons 11 upon the metal panel 10 of the roadsign the panel 10 is in this invention merely provided with a plurality of holes 25 which are suitably drilled or punched in the panel 10. The cylindrical spring clip 16 is then inserted within the hole 25, the arms 23 entering the hole while the shoulder 22 engages the inner surface of the hole 25. Pressure is then applied to the flange 21 of the spring clip 16 to force the flange 22 into the hole 25. The slot 30 permits the diameter of the spring clip 16 to reduce sufficiently to allow the shoulder 22 to enter the hole 25. The spring clip 16 is then moved with respect to the hole 25 until the rear face 26 of the panel 10 is adjacent the shoulder 22 at which time the spring clip 16 will expand due to the spring action of the clip to cause the edge of the hole 25 in the panel 10 to ride within the annular groove 20 of the spring clip 16. The flange 21 will now be in position adjacent the front face 27 of the panel 10, this position of the spring clip 16 being shown in Figure 2.

The reflector button 11 can now be positioned within the spring clip 16 and, since the shank 13 of the reflector button is of slightly less diameter than the internal diameter of the annular groove 20 of the spring clip 16 the shank 13 will readily enter the spring clip 16. The shank of the reflector button 11 is moved forwardly within the spring clip 16 until the end 29 of the shank 13 engages the arms 23 of the spring clip 16. Pressure is then applied upon the reflector button 11 to move the same rearwardly with respect to the spring clip 16 whereby the arms 23 expand to permit the end 29 of the shank 13 to pass therebetween. When the reflector button 11 has moved rearwardly a sufficient distance the arms 23 will spring inwardly to engage the shoulder 19 provided on the shank 13 of the reflector button 11. The assembled relationship of the reflector button and the spring clip 16 is shown in Figure 2.

It will readily become apparent from the showing in Figure 2 that once the arms 23 have sprung inwardly against the angular face 18 and behind the shoulder 19 that the reflector button 16 cannot be pushed outwardly or forwardly with respect to the panel 10. The spring clip 16 cannot be removed from the hole 25 in the panel 10 since the shank 13 of the reflector button 11 will not permit sufficient reduction in diameter of the annular groove 20 to allow either of the flanges 21 or 22 to pass within the hole 25 as long as the shank 13 of the reflector button 11 is positioned within the spring clip 16. Since the spring clip 16 cannot be removed from the hole 25 and since the arms 23 of the spring clip 16 engage a vertical shoulder 19 it will readily become apparent that if the end 29 of the shank 13 is enclosed that the reflector button 11 cannot be removed from the panel 10 without substantially destroying the button 11.

Since most road signs are provided with an enclosing rear wall 31 it will be seen that the cooperation between the spring clip 16 and the shank 13 of the reflector button 11 provides a tamper proof fastening device for the reflector button.

As shown in Figures 4 and 5 the fastening device of this invention is applied to a use which is somewhat remote from the securing of reflector buttons upon roadside panels in that the fastening device is used for securing a decorative panel or trim strip to a metal sheet or like structure. However, the construction of the fastening device is identical with the construction heretofore described with regard to Figures 2 and 3. In this modification the shank 13a, formerly described as the shank of a reflector button, now is provided as a protrusion extending from a trim strip 35. The panel 36 upon which the trim strip 35 is to be applied is provided with holes 25a in the same manner as heretofore described with regard to the panel 10, but are spaced with respect to one another at suitable intervals to permit a relatively long trim strip 35 to be secured to the panel 36. The panel 36 can either be a thin sheet metal wall or can be a relatively heavy wall and the groove 20a of the spring clip 16a will be made of a sufficient width to accommodate the wall thickness. The shank 13a of the trip strip 35 is assembled within the spring clip 16a in the same manner as heretofore described, the trim strip 35 thus being secured to the panel 36 in a permanent relationship depending of course upon whether or not the end 29a of the shank 13a is exposed to permit manual manipulation of the arms 23a. If the arms 23a are not exposed then the trim strip 35 will be secured permanently to the panel 36 by a tamper proof fastening connection.

In Figure 6 the fastening device is shown as used for securing two or more metal panels in adjacent relationship. In this modification the spring clip 16b is provided with a groove 20b of sufficient width to receive the metal sheets 32 and 33. While these sheets have been referred to as metal sheets, yet any other form of panel can be substituted. The sheets 32 and 33 are provided with holes 37 and 38 which are adapted to be positioned in axial alignment when the sheets are in adjacent relationship. The spring clip 16b enters the holes 37 and 38 in the same manner as heretofore described so that the annular groove 29b is in a position to retain the sheets 32 and 33 in adjacent relationship. If desired, the flanges 21b and 22b can be provided with a certain amount of spring tension to retain the metal sheets 32 and 33 in relatively tight adjacent relationship.

A button 40 is constructed in the same manner as the reflector button 11 shown in Figures 2 and 3 except that the reflector face 12 of the reflector button 11 need not be used upon the button 40, the button 40 being used as a locking device. When fastening two or more metal sheets together the button 40 is inserted within the spring clip 16b in the same manner as heretofore described with regard to the reflector button 11, the spring clip 16b and the button 40 cooperating to provide a fastening means between the metal sheets 32 and 33. The fastening device, shown in Figure 6 can be made tamper proof in the same manner as heretofore described with regard to the other modifications.

From the foregoing description and the various modifications shown in the drawing it can be seen that the fastening device of this invention has a diversity of uses and is not limited to any particular combination, all of which uses fall within the scope of the appended claims.

Having thus fully described my invention, what I claim as new and desire to secure by Letters Patent is:

1. A fastening device consisting of a hollow sheet metal body having a recessed groove in one end that extends around the periphery of said body, the opposite end of said body having portions thereof cut out around the periphery of the body whereby the remaining portions of the body form flexible finger members extending from said groove, said fingers being bent arcuately toward the center of said body, a slot in said body extending longitudinally throughout the full length thereof to provide radial resiliency to said body, a second member having a body substantially equal to the internal dimension of said sheet metal body at the groved end thereof provided with an enlarged shoulder forming a head on one end and a recess in the opposite end thereof, said second member being adapted to enter said sheet metal body through the grooved end thereof to position said second member within said sheet metal body with the groved end thereof engaging said shoulder and with said fingers in said recess.

2. A fastening device consisting of a cylindrical hollow sheet metal body having an annular recessed groove in one end that extends around the periphery of said body, the opposite end of said body having portions thereof cut out around the periphery of the body whereby the remaining portions of the body form flexible finger members extending from the outer periphery of said groove, said fingers being bent arcuately toward the center of said body, a slot in said body extending longitudinally throughout the full length thereof to provide radial resiliency to said body, a second member having a cylindrical body substantially equal to the internal diameter of said sheet metal body at the grooved end thereof provided with an enlarged head forming a radially extending annular shoulder on one end and an annular recess in the opposite end thereof, said second member being adapted to enter said sheet metal body through the grooved end thereof to position said second member within said sheet metal body with the grooved end thereof engaging said shoulder and with said fingers in said recess.

3. A fastening device comprising a cylindrical C shaped sheet metal body, a recess depressed radially inwardly in said body adjacent one end thereof extending annularly around said body, one edge of said recess forming a substantially radial flange to engage one edge of an aperture provided in a support member and the opposite edge of said recess forming an abutment to engage the opposite edge of the aperture to position said body in the aperture, arcuately shaped fingers extending longitudinally from the abutment edge of said recess and extending radially inwardly toward the center of said body, the slit in said C shaped body being of sufficient width to permit said body to flex radially inwardly when inserting said fingers through an aperture to thereby cause said recess to snap into engagement with the aperture, a stud of sufficient size to engage the inner periphery of said body insertable through the recessed end of said body to prevent radial inward flexing of said body sufficient to permit removal of said recess from the aperture, said stud having a shoulder forming head on one end thereof for engaging said recess flange and an annular recess in the opposite end thereof engaged by said fingers to thereby prevent removal of said stud from within said body when inserted therein.

CHARLES D. RYDER.